UNITED STATES PATENT OFFICE.

GUSTAF M. WESTMAN, OF NEW YORK, N. Y.

METHOD OF SEPARATING PRECIOUS METALS FROM THEIR ORES.

SPECIFICATION forming part of Letters Patent No. 588,204, dated August 17, 1897.

Application filed June 25, 1895. Serial No. 554,042. (Specimens.)

*To all whom it may concern:*

Be it known that I, GUSTAF M. WESTMAN, of New York, in the county and State of New York, have invented a new and Improved Method of Separating Precious Metals from Their Ores, of which the following is a full, clear, and exact description.

The object of the invention is to provide a new and improved method of separating precious metals, such as gold and silver, contained in refractory and other ores, in a very simple and comparatively cheap manner.

The method consists in forming a molten mass of the ore containing the precious metals and then subjecting the running molten mass to the action of jets of steam, air, or other fluid, to form mineral wool and to cause the minutely-divided particles of the precious metal to collect on and adhere to the mineral wool and then subjecting the wool to a leaching process to separate the metal from it.

In order to carry this process into effect, I proceed in detail as follows: The mined ore containing the precious metal in either free state or combined with other substances is first reduced with the assistance of a suitable flux and in an ordinary blast or other furnace to a molten mass or slag, and this mass while running in a stream from the furnaces is subjected to the action of jets of steam, air, or other fluid to form mineral wool in the usual manner. During this process the precious metals contained in the molten mass are divided into minute particles by the action of the steam, and these particles are deposited on and adhere to the mineral wool. The latter is then treated to a leaching process with free chlorin gas in a solution to separate the precious metal from the mineral wool. I do not, however, propose to restrict myself in all cases to this method of separation.

It will be seen that by this very simple process the precious metal, no matter how finely divided in the most refractory ore or in combination with other substances, is readily separated and obtained in a very economical manner, at the same time obtaining as a by-product mineral wool, which after the leaching process is dried, so as to be in a marketable condition.

Having thus described my invention, I claim as new and desire to secure by Letters Patent—

1. The herein-described method of separating precious metals from their ores, consisting in first melting the ores to form a molten mass or slag, and then subjecting this mass to the action of jets of fluid to form mineral wool, to divide the precious metal into minute particles which collect on and adhere to the mineral wool, and then subjecting the mineral wool to a leaching process, to separate the precious metal and the wool, substantially as shown and described.

2. The herein-described process of separating precious metals from their ores, consisting in first reducing the ore with a flux in a furnace to form a molten mass, then subjecting the flowing molten mass to the action of jets of fluid, to form mineral wool and cause the precious metals to collect or adhere in a finely-divided state or minute particles on the said wool, and finally separating the wool and the precious metals, substantially as shown and described.

GUSTAF M. WESTMAN.

Witnesses:
   THEO. G. HOSTER,
   C. SEDGWICK.